(12) United States Patent
Charles et al.

(10) Patent No.: US 9,162,597 B2
(45) Date of Patent: Oct. 20, 2015

(54) SEAT ARMREST FRAME

(71) Applicant: Faurecia Sieges D'Automobile, Nanterre (FR)

(72) Inventors: Philippe Charles, Luxeuil les Bains (FR); Blandine Calais, Antony (FR); Stéphane Soltner, Mailleroncourt-Charette (FR)

(73) Assignee: Faurecia Sieges D'Automobile (FR)

( * ) Notice: Subject to any disclaimer, the term of this patent is extended or adjusted under 35 U.S.C. 154(b) by 314 days.

(21) Appl. No.: 13/705,905

(22) Filed: Dec. 5, 2012

(65) Prior Publication Data

US 2013/0147251 A1    Jun. 13, 2013

(30) Foreign Application Priority Data

Dec. 7, 2011  (FR) .................................. 11 61284

(51) Int. Cl.
*A47C 7/54* (2006.01)
*B60N 2/46* (2006.01)
*B29C 69/00* (2006.01)
*B60N 2/68* (2006.01)

(52) U.S. Cl.
CPC .............. *B60N 2/4633* (2013.01); *B29C 69/00* (2013.01); *B60N 2/46* (2013.01); *B60N 2/4613* (2013.01); *B60N 2/682* (2013.01); *Y10T 29/49826* (2015.01)

(58) Field of Classification Search
CPC ....................................................... A47C 7/543
USPC .......... 297/411.2, 411.3, 411.32, 452.18, 113
See application file for complete search history.

(56) References Cited

U.S. PATENT DOCUMENTS

| 7,395,997 | B2 * | 7/2008 | Padden ......................... 248/303 |
| 2005/0129901 | A1 * | 6/2005 | Swindler et al. ................ 428/76 |
| 2010/0207441 | A1 | 8/2010 | Senges et al. |
| 2011/0148171 | A1 * | 6/2011 | Charles et al. ................ 297/410 |

FOREIGN PATENT DOCUMENTS

| DE | 202008009374 U1 | 12/2008 |
| EP | 0518358 A1 | 12/1992 |
| GB | 2381741 A | 5/2003 |

OTHER PUBLICATIONS

Nikolaos Zevelakis, "FR Patent Application Number: 1161284 Search Report", Oct. 4, 2012, Publisher: INPI, Published in: FR.

* cited by examiner

*Primary Examiner* — Matthew Ing
(74) *Attorney, Agent, or Firm* — Kaplan Breyer Schwarz & Ottesen, LLP

(57) ABSTRACT

An armrest frame including a first portion including a shaft and a single plastic material lining overmolded around the shaft and a second portion including at least one branch attached to the lining. A seat including a backrest and an armrest including such a frame, pivotally connected to the backrest.

11 Claims, 4 Drawing Sheets

SEAT ARMREST FRAME

BACKGROUND

The present disclosure relates to a seat armrest frame, especially for a motor vehicle seat.

DISCUSSION OF THE RELATED ART

Certain motor vehicles may have a seat comprising a central armrest capable of pivoting between a retracted position and a position of use. In the retracted position, the armrest may be folded back against the seat backrest and, in the position of use, the armrest may be substantially parallel to the seating part of the seat.

The armrest generally comprises a frame pivotally assembled on the seat backrest frame. Upholstery, formed of a foam cushioning contained in a fabric cover, surrounds the frame.

DE 202008009374 describes armrest frames comprising a frame formed of steel metal rods having their ends interconnected by plastic connection elements overmolded on the ends of the rods at the four corners of the frame.

The armrest frames described in this document have several disadvantages. Indeed, the mold dimensions are significant since the mold must contain all metal rods to simultaneously form the connection elements. The mold thus has a high manufacturing cost. Further, the connection elements being arranged at the four corners of the frame, at least four points of injection of the plastic material into the mold have to be provided. The implementation of the overmolding process is thus complex.

Further, the full armrest frame is obtained after the overmolding step. Specific precautions must be taken during the frame transport and the storage to avoid damaging it.

There thus is a need for a seat armrest frame having a structure adapted to the implementation of simplified manufacturing, transport, and storage processes.

SUMMARY

An object of an embodiment is to overcome the disadvantages of previously-described armrest structures.

Another object of an embodiment is to provide a seat armrest frame having its manufacturing comprising the use of a mold of simple structure and of decreased size.

Another object of an embodiment is to provide a seat armrest frame which can be transported and stored with minimized specific precautions.

Another object of an embodiment is to provide a seat armrest frame of simple structure.

Thus, an embodiment provides an armrest frame comprising a first portion comprising a shaft and a single plastic material lining overmolded around the shaft and a second portion comprising at least one branch attached to the lining.

According to an embodiment, the second portion comprises two branches attached to the lining.

According to an embodiment, the lining comprises a first protrusion comprising a first opening and a second protrusion comprising a second opening, the end of one of the branches penetrating into the first opening and the end of the other branch penetrating into the second opening.

According to an embodiment, the lining further comprises a first planar fin extending from the first protrusion parallel to the shaft axis and a second planar fin extending from the second protrusion parallel to the shaft axis.

According to an embodiment, the lining covers the shaft at least between the first and second protrusions.

According to an embodiment, the shaft comprises two axial ends forming a pivot and an external surface connecting the two axial ends, the lining covering the entire external surface.

According to an embodiment, the lining comprises at least one clamp-shaped element intended to cooperate with the seat in use.

Another embodiment provides a seat comprising a backrest and an armrest comprising a frame such as previously defined, pivotally connected to the backrest.

Another embodiment provides a method for manufacturing the frame such as previously defined, comprising the steps of:

arranging the shaft in a mold comprising at least one point of injection of the plastic material;

forming the first portion by overmolding of the single lining around the shaft by introducing the plastic material into the mold through the injection point;

removing the first portion from the mold; and attaching the second portion to the lining.

According to an embodiment, the mold comprises a single point of injection of the plastic material and the first portion is formed by overmolding of the single lining around the shaft by introducing the plastic material into the mold through the single injection point.

According to an embodiment, the second portion is tight-fit into the lining of the first frame portion.

The foregoing and other features and advantages will be discussed in detail in the following non-limiting description of specific embodiments in connection with the accompanying drawings.

DETAILED DESCRIPTION

Figure 1:
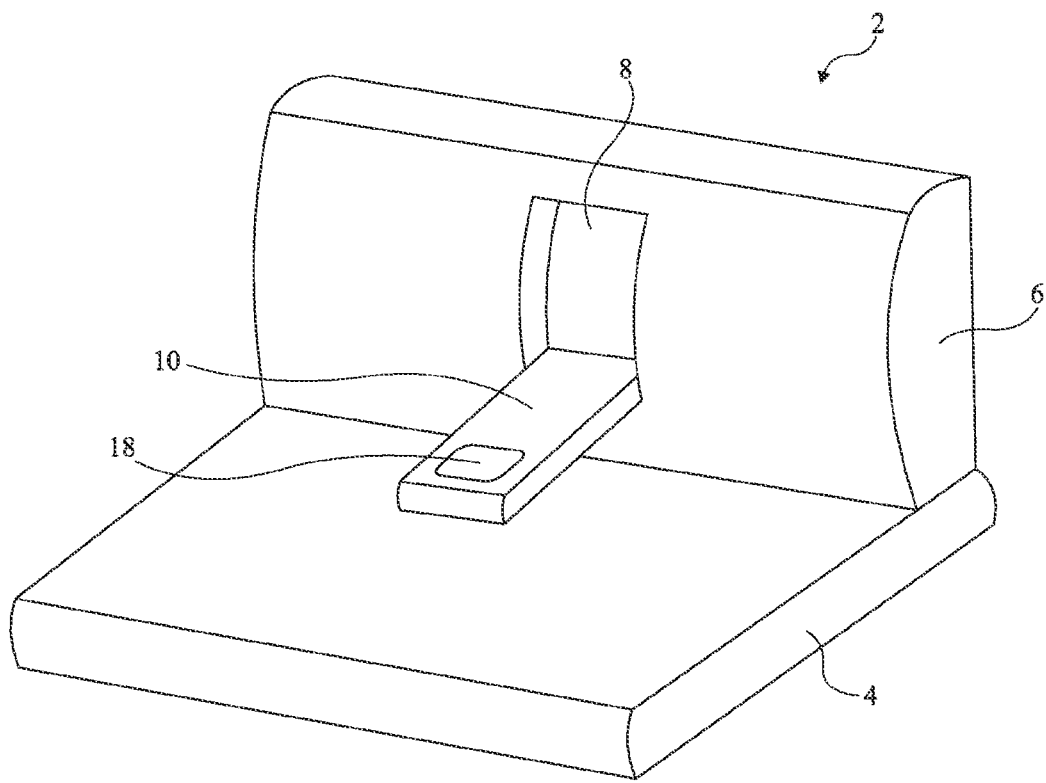
FIG. 1 is a simplified perspective view of a seat comprising an embodiment of an armrest.

For clarity, the same elements have been designated with the same reference numerals in the different drawings. Further, only those elements which are necessary to the understanding of the present disclosure are described in detail hereinafter.

FIG. 1 schematically shows a seat 2, for example, a motor vehicle back seat 2, comprising a seating 4 and a backrest 6 connected to seating 4. Seat 2 further comprises an armrest 10 pivotally connected to backrest 6 and capable of being pivoted between a position of use and a retracted position. In its position of use, armrest 10 is substantially parallel to seating 4 of seat 2. In retracted position, armrest 10 is folded against backrest 6 of the seat and is partly arranged in a recess 8 provided in backrest 6.

Figure 2:
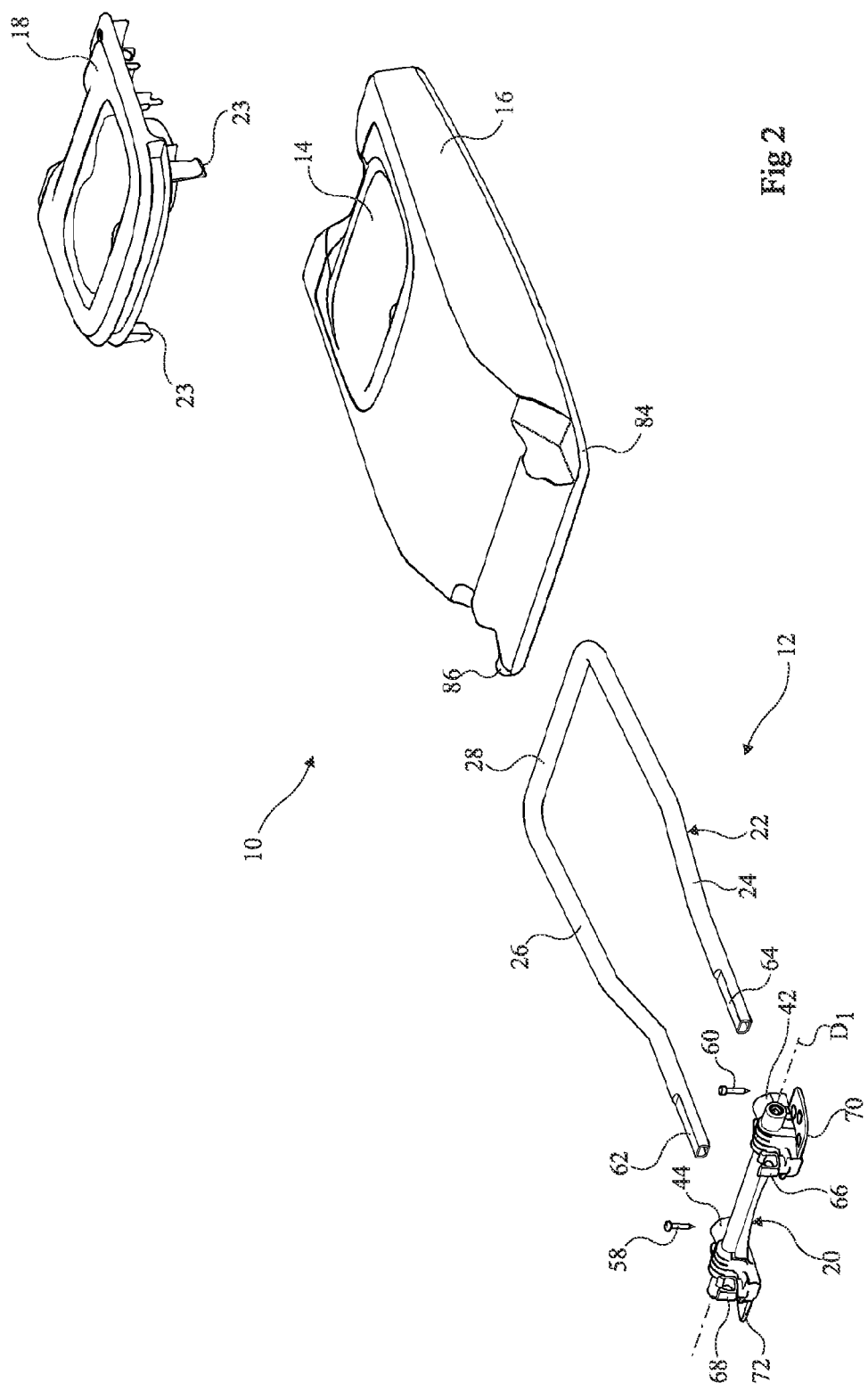
FIG. 2 is an exploded perspective view of the armrest of FIG. 1.

FIG. 2 shows an exploded view of an embodiment of armrest 10. Armrest 10 comprises:

a frame 12 intended to be attached to the frame, not shown, of backrest 6 of seat 2;

upholstery 14 at least partially surrounding frame 12, the upholstery for example comprising a foam cushioning contained in a fabric cover 16; and possibly an accessory 18 attached to frame 12.

In the embodiment, accessory 18 is a cup holder. Upholstery 14 may partially surround accessory 18 and cover 16 may be attached to cup holder 18. Frame 12 comprises a first frame portion 20 and a second frame portion 22 attached to first frame portion 20. Cup holder 18 may be attached to frame 12, for example, on the side of second frame portion 22 opposite to first frame portion 20, via flexible tabs 23. According to a variation, accessory 18 is not present.

Figure 3:
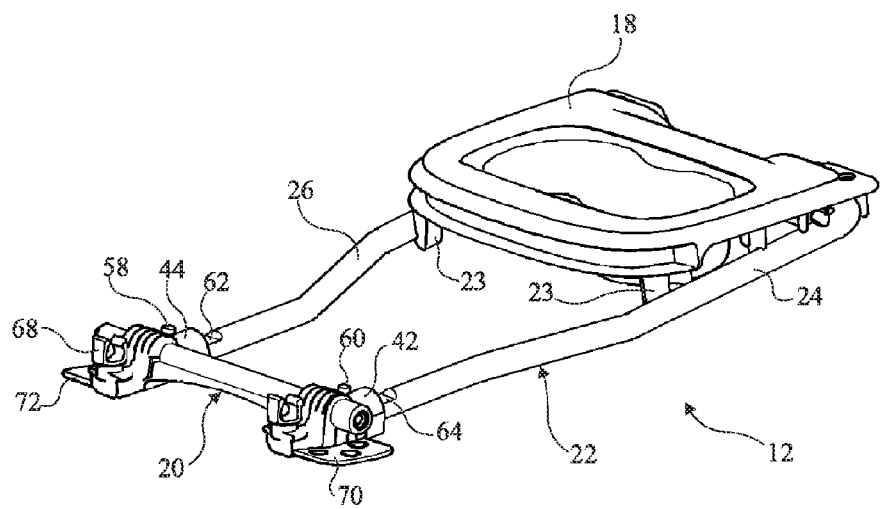
FIG. 3 is a perspective view of the frame and of a cup holder of the armrest of FIG. 2.
Figure 4:
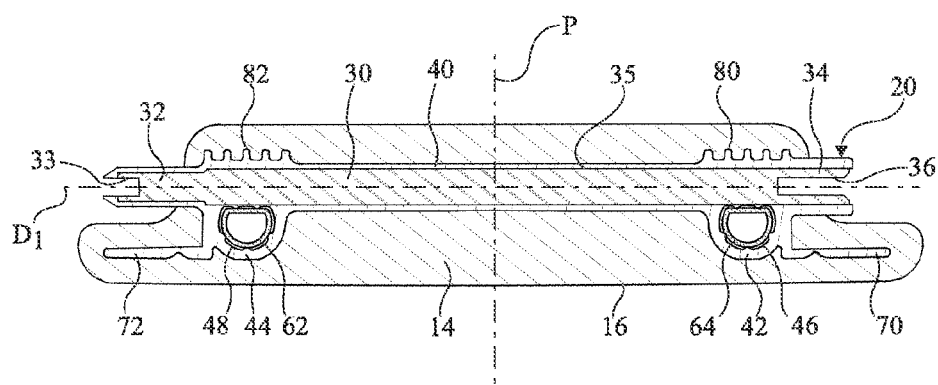
FIG. 4 is a cross-section view of the armrest of FIG. 2.
Figure 5:
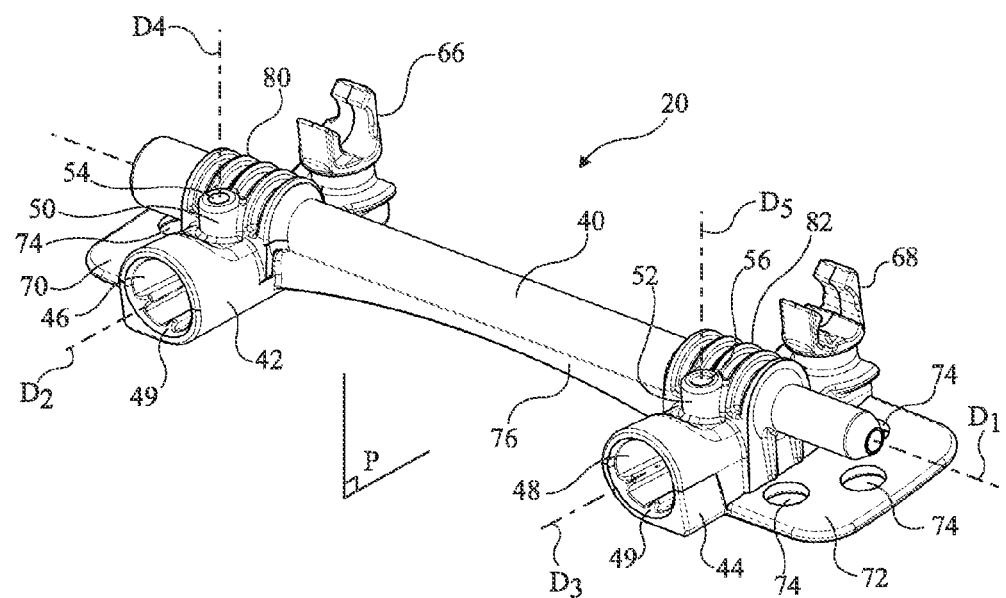
FIG. 5 is a perspective view of a portion of the armrest of FIG. 2.

FIG. 3 is a perspective view of frame 12 and of cup holder 18. FIG. 4 is a cross-section view of the armrest. FIG. 5 shows a perspective view of first frame portion 20.

Second frame portion 22 comprises a hollow rod which is given a general "U" shape and comprising two parallel arms 24, 26 connected by a base 28. Rod 22 may be a rod of circular cross-section having a diameter varying between 12 and 18 mm, for example on the order of 14 mm. As a variation, rod 22 may correspond to a solid tube. Further, rod 22 may have a cross-section other than circular, for example, square or rectangular. Rod 22 may be made of any adapted material, for example, of a metal alloy, for example steel, a copper alloy, a zinc alloy, or an aluminum alloy. As a variation, second frame portion 22 may comprise a single arm which extends in an element forming a frame.

First frame portion 20 comprises a shaft 30 of axis $D_1$. Shaft 30 for example is a solid cylindrical rod having a diameter that may vary between 8 and 10 mm. The axial length of shaft 30 may vary between 150 mm and 280 mm. Shaft 30 comprises axial ends 32 and 34 and an external surface 35 between the axial ends. Shaft 30 may comprise a portion of decreased diameter at axial end 32. Further, a cylindrical opening 33 of axis $D_1$ may be provided at axial end 32. At opposite end 34, shaft 30 may comprise a threaded opening 36 of axis $D_1$. Shaft 30 is made of a metal alloy, for example, steel. Shaft 30 and second frame portion 22 may be made of identical or different metal alloys. First frame portion 20 may have a structure approximately symmetrical with respect to a median plane P perpendicular to axis $D_1$.

First frame portion 20 further comprises a lining 40 of plastic material overmolded on shaft 30. As an example, the plastic material is a polyamide comprising glass fibers or a mineral filler. Lining 40 covers the entire external surface 35 of shaft 30. As a variation, it is possible for lining 40 not to cover ends 32, 34 of shaft 30. Lining 40 further comprises two protrusions 42, 44. Protrusion 42 delimits an opening 46 which extends along an axis $D_2$ perpendicular to axis $D_1$ and protrusion 44 delimits an opening 48 which extends along an axis $D_3$ perpendicular to axis $D_1$. Ribs 49 may be provided in openings 46, 48 and extend along axes $D_2$ and $D_3$. The cross-section plane of FIG. 4 contains axis $D_1$ and is perpendicular to axes $D_2$ and $D_3$.

In the present embodiment, lining 40 further comprises two cylindrical portions 50, 52. Cylindrical portion 50 delimits a cylindrical opening 54 of axis $D_4$ perpendicular to axes $D_1$ and $D_2$ and emerging into opening 46 and cylindrical portion 52 delimits a cylindrical opening 56 of axis $D_5$ perpendicular to axis $D_2$ and emerging into opening 48. Openings 54, 56 are intended for the passing of screws 58, 60 shown in FIG. 2.

Free ends 62, 64 of arms 24, 26 of the second frame portion penetrate into openings 46, 48. Each end 62, 64 of arm 24, 26 comprises a flat side and the associated opening 46, 48 may have a shape at least partly complementary to this end 62, 64.

The ends of screws 58, 60 bear against flat sides 62, 64 and ensure the fastening of end portions 62, 64 in openings 46, 48. As a variation, it is possible to omit screws 58, 60 and to attach ends 62, 64 of arms 24, 26 in openings 46, 48 by any means, especially by force fitting, by gluing, by riveting, or by snapping. In the alternative embodiment where second frame portion comprises a single arm, lining 40 may comprise a single protrusion having the single arm attached therein.

Lining 40 further comprises two fastening portions 66, 68, each being clamp-shaped. Each fastening portion 66, 68 is arranged substantially diametrically opposite to one of protrusions 42, 44 with respect to shaft 30. As a variation, it is possible for lining 40 to comprise a single fastening portion. Lining 40 further comprises two lateral fins 70, 72, which may be crossed by openings 74. Each fin 70, 72 has a planar shape. Fin 70 extends parallel to axis $D_1$ from protrusion 42, away from symmetry plane P of first frame portion 20. Fin 72 extends parallel to axis $D_1$ from protrusion 44, away from symmetry plane P of first frame portion 20. As a variation, lining 40 comprises no fin or comprises a single fin.

Further, lining 40 may comprise stiffening ribs, and especially a rib 76 which extends between two portions 42, 44. Lining 40 comprises striated stiffening portions 80, 82. Striated portion 80 comprises striations which extend radially with respect to axis $D_1$ between protrusion 42 and fastening portion 66 and striated portion 82 comprises striations which extend radially with respect to axis $D_1$ between protrusion 44 and fastening portion 68.

In operation, ends 32, 34 of shaft 30 covered with lining 40 are pivotally assembled on the frame of backrest 6 of seat 2. The fact for lining 40 to cover ends 32, 34 of shaft 30 advantageously enables to easily form a smooth plastic bearing. When ends 32, 34 of shaft 30 are not covered with the lining, ends 32, 34 of shaft 30 may be pivotally assembled on the frame of backrest 6 by means of metal bearings or via rolling bearings.

Clamp-shaped portions 66, 68 are capable of temporarily clamping a rod of the frame of backrest 6, not shown, when armrest 10 is in position of use. A force greater than a given threshold should then be applied to armrest 10 so that fastening portions 66, 68 release the rod of the frame of backrest 6 and that armrest 10 leaves its position of use. This especially enables to avoid unwanted vibrations of armrest 10 in its position of use.

Fins 70, 72 are arranged in regions 84, 86 of armrest 10 where the thickness of upholstery 14 is decreased. Fins 70, 72 enable to locally increase the stiffness of armrest 10.

Figure 6:
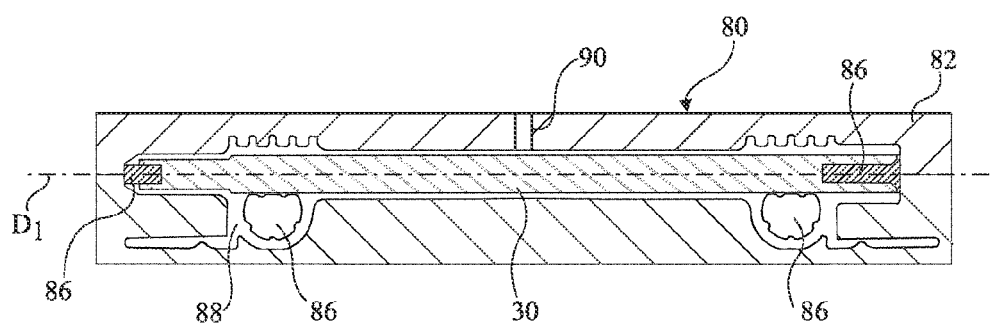
FIG. 6 is a cross-section view of a mold at a step of the manufacturing of the frame portion of FIG. 2.

FIG. 6 illustrates a step of the method for manufacturing first frame portion 20. The method comprises a step of overmolding of a plastic material around shaft 30 to form lining 40. The overmolding step uses a mold 80 comprising an upper mold portion 82 and a lower mold portion 84. Shaft 30 is arranged in mold 80. Additional parts 86 are arranged in the mold to delimit, with shaft 30 and mold portions 82, 84, a cavity 88 intended to be filled with the plastic material. Advantageously, lining 40 covers the entire external surface of shaft 30. A single point of injection 90 of the plastic material then should be provided in mold 80. This eases the manufacturing of first frame portion 20.

The manufacturing method according to the present invention advantageously enables to form a lining 40 with a single molding step. The main function of lining 40 is to fasten second frame portion 22 to first frame portion 20. However, since lining 40 is formed by molding, the present invention advantageously enables to integrate additional functions to lining 40, such as those ensured by clamp-shaped portions 66, 68, fins 70, 72, and stiffening ribs. If second frame portion 22 was directly attached to first frame portion 20, such additional functions should be ensured by additional parts placed on first frame portion 20.

The assembly of second frame portion 22 on first frame portion 20 may be performed in a site different from the site where first frame portion 20 is manufactured. Thereby, the transport and the storage of first frame portion 20 and of second frame portion 22 from their manufacturing site to the site of assembly of armrest 10 may be performed separately.

On the assembly site, second frame portion 22 is attached to first frame portion 20. An accessory, for example, cup holder 18, may be attached to frame 12, for example, on the side of second frame portion 22 opposite to first frame portion 20. Upholstery 14 may be formed according to a manufacturing method called in situ method, according to which the cushioning is formed in contact with the cover. However, the cushioning of upholstery 14 may be formed separately. The cushioning may then be arranged first on frame 12 and cover 16 is then attached to the cushioning and possibly also to cup holder 18.

Specific embodiments of the present invention have been described. Various alterations, modifications, and improvements will occur to those skilled in the art. In particular, instead of a cup holder, accessory 18 may be a storage that may be closed by a lid.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A frame of an armrest comprising:
   a first portion comprising a shaft and a single plastic material lining overmolded around the shaft so that the lining covers an entire external surface of the shaft or the entire external surface of the shaft except axial ends of the shaft; and
   a second portion comprising at least one branch attached to the lining.

2. The frame of claim 1, wherein the second portion comprises two branches attached to the lining.

3. The frame of claim 2, wherein the lining comprises a first protrusion comprising a first opening and a second protrusion comprising a second opening, the end of one of the branches penetrating into the first opening and the end of the other branch penetrating into the second opening.

4. The frame of claim 3, wherein the lining further comprises a first planar fin extending from the first protrusion parallel to the shaft axis and a second planar fin extending from the second protrusion parallel to the shaft axis.

5. The frame of claim 3, wherein the lining covers the shaft at least between the first and second protrusions.

6. The frame of claim 1, wherein the axial ends of the shaft form a pivot.

7. The frame of claim 1, wherein the lining comprises at least one clamp-shaped element intended to cooperate with the seat in use.

8. A seat comprising:
   a backrest; and
   an armrest comprising the frame of claim 1 pivotally connected to the backrest.

9. A method for manufacturing the frame of claim 1, comprising the steps of:
   arranging the shaft in a mold comprising at least one point of injection of the plastic material;
   forming the first portion by overmolding of the single lining around the shaft by introducing the plastic material into the mold through the injection point;
   removing the first portion from the mold; and
   attaching the second portion to the lining.

10. The manufacturing method of claim 9, wherein the mold comprises a single point of injection of the plastic material and wherein the first portion is formed by overmolding of the single lining around the shaft by introducing the plastic material into the mold through the single injection point.

11. The manufacturing method of claim 10, wherein the second portion is tight-fit into the lining of the first frame portion.

\* \* \* \* \*